United States Patent [19]

Suica et al.

[11] Patent Number: 4,754,540
[45] Date of Patent: Jul. 5, 1988

[54] METHOD OF MAKING BEARING BLOCK FOR ROBOTIC MANIPULATOR

[75] Inventors: David E. Suica; Walter Binder; Edward J. Bailey, all of Cincinnati, Ohio

[73] Assignee: Cincinnati Milacron Inc., Cincinnati, Ohio

[21] Appl. No.: 91,305

[22] Filed: Aug. 24, 1987

Related U.S. Application Data

[62] Division of Ser. No. 13,410, Feb. 11, 1987.

[51] Int. Cl.⁴ ............................................. B23P 17/00
[52] U.S. Cl. ................................. 29/416; 29/156.5 A; 29/445; 29/463; 384/457; 414/744 R
[58] Field of Search ............... 29/416, 445, 149.5 R, 29/156.5 A, 526 R, 463; 384/291, 432, 457; 414/744 R

[56] References Cited

U.S. PATENT DOCUMENTS

| 1,498,748 | 6/1924 | Pierce, Jr. | 29/156.5 A UX |
| 1,905,925 | 4/1933 | Manning | 29/156.5 A |
| 2,145,864 | 2/1939 | Denneen et al. | 29/156.5 A X |
| 2,371,400 | 3/1945 | Mantle | 29/156.5 A UX |
| 2,659,636 | 11/1953 | Wheelis | 384/457 |
| 2,875,513 | 3/1959 | Dulin | 29/156.5 A X |
| 3,304,134 | 2/1967 | Allen | 384/432 |
| 4,030,179 | 6/1977 | Schwarz | 29/156.5 A |
| 4,458,555 | 7/1984 | Holtzberg et al. | 29/156.5 A X |
| 4,576,488 | 3/1986 | Steiner et al. | 384/291 |

Primary Examiner—Charlie T. Moon
Attorney, Agent, or Firm—Thomas M. Farrell

[57] ABSTRACT

A bearing block for anchoring a self-contained bearing for a moving part of a robotic manipulator to such robotic manipulator is provided, wherein the self-contained bearing has a known outside diameter. In particular, the bearing block comprises a body portion having attachment means for attaching the bearing block to the robotic manipulator, with such body portion being split into a base piece and a clamp piece along a dividing axis. A bearing race or bore is formed through the body portion and centered therewithin on the dividing axis. The bore is formed after the body portion has been split along the dividing axis, and has an effective diameter slightly undersized relative the outside diameter of the self-contained bearing to be held therewithin. Means are provided to removably attach the clamp piece to the base piece and to thereby provide relatively uniform inward compressive forces about substantially the entire outer periphery of the bearing when the clamp piece is attached to the base piece thereabout.

4 Claims, 3 Drawing Sheets

METHOD OF MAKING BEARING BLOCK FOR ROBOTIC MANIPULATOR

This is a division of application Ser. No. 013,410 filed Feb. 11, 1987.

TECHNICAL FIELD

This invention relates to bearing blocks for anchoring bearings for movable parts of machinery to that machinery, and, more particularly, to bearing blocks for anchoring self-contained bearings for moving parts of a robotic manipulator to the robotic manipulator.

BACKGROUND ART

In robotic manipulators and other similar devices, various bearings for movable parts must be anchored to such robots to provide pivot points about which those moving parts can rotate. When standard tapered bearings are used, a bearing retention shoulder must be formed within such bearing anchor to properly retain the bearing therewithin. For example as described in U.S. Pat. No. 4,392,776, which was issued L. Y. Shum on July 12, 1983, a pair of oppositely disposed shoulders can be used to exert a diagonal clamping action on angular contact bearings to obviate backlash which can arise in conventional bearings. However, as shown in FIG. 3 of the Shum patent, the resulting diagonal clamping action does not provide uniform clamping around the periphery of such bearing. Moreover, moving parts often have various pivot points which must be accurately aligned relative to one another for proper movement of such parts and for protection of their often delicate structures. Such alignment of moving parts, bearings and bearing retention shoulders often involve relatively complex alignment procedures with relatively small margins for error. Where permanently located bearing shoulders are involved, this alignment can be costly, time consuming and necessarily repeated often. For example, alignment done during a manufacturing phase of a machine may be adversely affected by the hazards of shipment and/or installation.

On the other hand, some types of bearings are axially self-contained. For the purposes of this disclosure, the term "self-contained" shall connote bearings which do not require additional embodiment structures such as the shoulder for tapered bearings. A bearing block for such bearings is commonly made by drilling a bore through such bearing block the same size as the outer diameter of the self-contained bearing, then splitting the bearing block through such bore to facilitate insertion of the bearing therewithin and later clamping of the cut half of the bearing block over the contained bearing. By cutting the bearing block through the bore formed therewithin, there is formed a gap between the two resulting pieces. When a bearing having an outside diameter equal to the bore diameter is placed therewithin, the bearing block pieces impose compressive forces on such contained bearings when clamped together.

However, in this traditional manner of clamping a self-contained bearing, because the bore formed within the bearing block is the same size as the outer diameter of the bearing, and due to the fact that there is now a gap between these two pieces of the bearing block, the inward compressive forces established by such bearing block parts upon the contained bearing tend to be concentrated in the closed ends of the bearing bore around only the top and bottom portions of the bearing. Because the bearing bore is the same size as the outer diameter of the bearing near the interface of the two parts of the bearing block, relatively no inward compressive forces are exerted on the bearing in these areas. Consequently, the uneven compressive forces tend to deform the bearing slightly, causing it to become out-of-round or egg-shaped, unless shims are carefully placed at the correct points between the bearing blocks and the bearing. Such shimming procedures are time consuming, costly, and not totally reliable. Improper shimming can lead to premature deterioration and failure of such bearing. Such shimming procedures can also adversely affect alignment of the moving part of the robotic manipulator.

As can be seen from a look at these standard industry structures, procedures and techniques, there remain definite problems in effectively anchoring bearings for moving parts of robotic manipulators in such a way as to ensure proper bearing installation while allowing relatively convenient aligning of such moving parts and replacement of worn bearings from time to time. With prior bearing block structures and methods, costly and time consuming alignment procedures were necessary, as well as difficult and often intricate shimming operations. The bearing block assembly which could provide relatively rapid installation, obviate a need for shims, and at the same time simplify alignment procedures was not available in the industry heretofore.

DISCLOSURE OF THE INVENTION

It is an object of this invention to obviate the above described problems.

It is another object of the present invention to provide a bearing block for anchoring a self-contained bearing for a moving part of a robotic manipulator to such robotic manipulator in a convenient and relatively economical manner.

It is yet another object of the present invention to provide a bearing block for anchoring a self-contained bearing which can provide relatively uniform inward compressive forces about such bearing without a need for additional shimming operations.

It is also an object of the present invention to provide a bearing block for anchoring a self-contained bearing for a moving part of a robotic manipulator which provides relatively uniform compressive forces about such self-contained bearing to substantially eliminate inherent bearing clearances while simultaneously facilitating alignment operations for such moving part on the robotic manipulator.

It is yet another object of the present invention to provide a method of manufacturing a bearing block for anchoring a self-contained bearing for a moving part of a robotic manipulator which provides the above-described advantages.

In accordance with one aspect of the present invention, there is provided a bearing block for anchoring a self-contained bearing for a moving part of a robotic manipulator to the robotic manipulator, wherein the self-contained bearing has a known outside diameter. In particular, the bearing block is to comprise a body portion having attachment means for attaching the bearing block to the robotic manipulator, with such body portion being split into a base piece and a clamp piece along a dividing axis. A bearing race or bore is formed through the body portion and centered therewithin on the dividing axis. The bore is formed after the body portion has been split along the dividing axis, and has an effective diameter slightly undersized relative the outside diameter of the self-contained bearing to be held therewithin. Means are provided to removably attach the clamp piece to the base piece and to thereby provide relatively uniform inward compressive forces about substantially the entire outer periphery of the bearing when the clamp piece is attached to the base piece thereabout.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
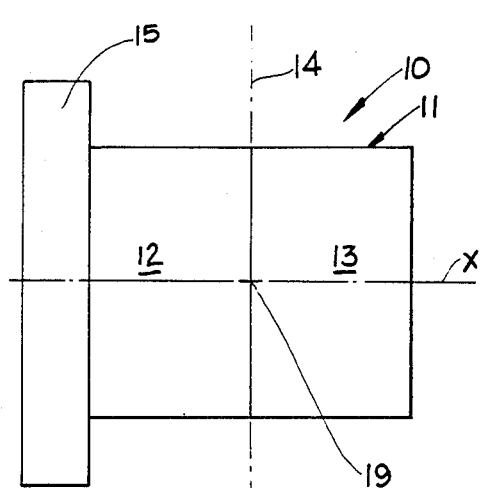
FIG. 1 is a side elevational view of a bearing block of the present invention shown prior to boring operations.
Figure 2:
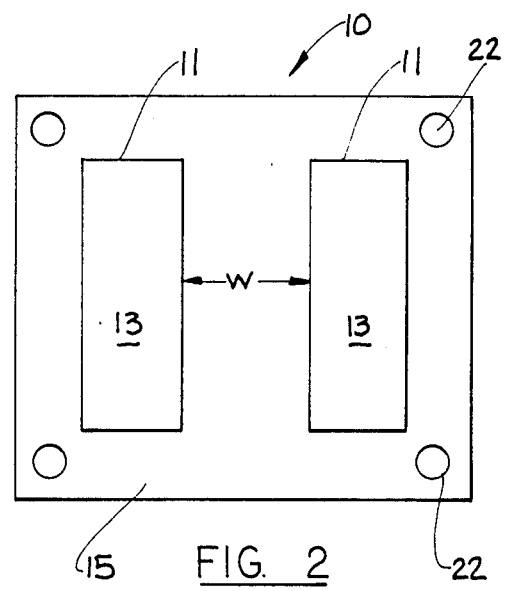
FIG. 2 is an elevational view taken from the right side of the bearing block of FIG. 1, and illustrating a bearing block featuring a pair of spaced body portions for anchoring a pair of spaced self-contained bearings.

Referring now to the drawings in detail, wherein like numerals indicate the same elements throughout the views, a bearing block 10 of the present invention is shown in FIG. 1 as including a body portion 11 which has been split into a base piece 12 and a clamp piece 13 along dividing axis 14. As bearing block 10 is to be used to anchor a self-contained bearing for a moving part of a robotic manipulator, it is understood that the material from which bearing block 10 is made should be strong and durable (e.g. steel). Bearing block 10 is illustrated in FIGS. 1 and 2 as comprising a mounting means 15 having two substantially identical bearing blocks 10 attached thereto and spaced from one another at the distance w. While it is to be understood that the bearing blocks of the present invention can equally function to anchor a self-contained bearing of a moving part of a robotic manipulator to such manipulator as a single unit, in practice it is often desirable to utilize a pair of spaced body portions 11 to anchor a corresponding pair of self-contained bearings which together provide a pivot axis about which the moving part rotates.

Mounting means 15 is depicted as a relatively standard flange structure having a plurality of holes 22 formed therethrough for accomodating threaded fasteners or the like to attach mounting means 15 to an appropriate portion of a robotic manipulator. The means of mounting bearing block 10 to the robotic manipulator is not critical and can be accomplished by other methods known in the industry, such as by simply welding these bearing blocks to the desired portion of a robotic manipulator.

Figure 3:
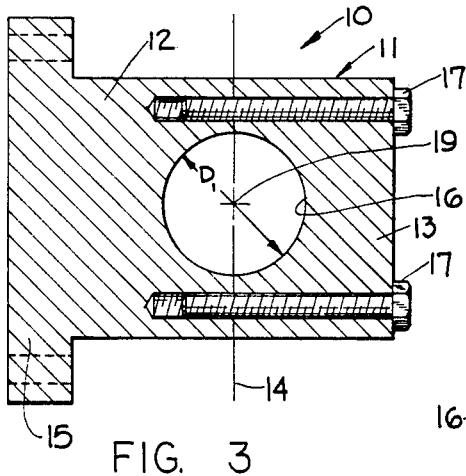
FIG. 3 is a cross-sectional view of a bearing block of the present invention illustrating such bearing block after its body portion has been split into base and clamping pieces, and after such base and clamp pieces have been removable attached to one another and the bearing race bore formed therethrough.

FIG. 3 illustrates a cross sectional view of a bearing block 10, wherein clamp piece 13 is attached to base piece 12 by means of a plurality of threaded fasteners 17. It is preferred that clamp piece 13 be attached to base piece 12 by such threaded fasteners 17 to provide relatively convenient removal of clamp piece 13 for initial anchoring of a bearing therewithin, replacement of a worn bearing, alignment of a movable part relative such bearing block, and the like.

FIG. 3 further illustrates bearing block 10 after bearing race bore 16 has been formed therethrough. In particular, after body portion 11 has been split to separate clamp and base pieces along dividing axis 14, a center point 19 of body portion 11 is located along dividing axis 14 for locating the center of bearing race bore 16. While it is preferred that center point 19 be located at approximately the true center point of body portion 11 along dividing axis 14, such need not be the case. It is only necessary to insure sufficient space around the chosen center point 19 to form bore 16 through bearing block 10 without approaching the edges thereof too closely. Clamp piece 13 is then clamped to base piece 12 and thereafter bearing race bore 16 is drilled through bearing block 10. Bore 16 is formed with effective diameter $D_1$ which is preferably slightly undersized relative the outside diameter $D_2$ of the bearing to be anchored therewithin, as will be described in greater detail below. It is preferred that four threaded fasteners be used to removably attach clamp piece 13 to base piece 12 in order to more evenly distribute the clamping force between such pieces.

It is understood in the industry that bearings are manufactured with a predetermined amount of clearance between their inner cell, the bearing rollers, and the outer cell. In practice, bearings are generally pressed onto a shaft or the like such that a continuous outward force tending to expand the inner cell of the bearing is exerted. A similar, inwardly directed compressive force is also necessary to eliminate as much of the inherent clearance of such bearings as possible. As described above, heretofore, clamping techniques about the outer periphery of a bearing have failed to achieve a uniform and continuous clamping about 360° of the bearing in order to establish an inwardly compressive force without deforming the shape of such bearing. For example, bearing clamps which are formed by drilling the bearing bore to the same size as the outer diameter of the bearing to be held therewithin, and thereafter splitting the clamp through such bore to facilitate insertion of the bearing and to provide a gap between such resulting pieces to allow clamping force to be imposed on such bearing, necessitated the use of shims adjacent the gaps in the bearing bore pieces and provided clamping forces about less than the full periphery of such bearing. In fact, generally, significant clamping force could be achieved about probably only the top 60° and the bottom 60° of the bearing, thereby subjecting the bearing held therewithin to non-uniform compressive forces that often caused such bearing to become egg-shaped or otherwise deformed.

Bearing block 10, made in accordance herewith exhibits the unique ability to establish relatively uniform inward compressive forces about substantially the entire periphery of bearing race bore 16 and the outer diameter of a self-contained bearing 30 held therewithin. As shown in FIG. 3, bearing race bore 16 is formed with an effective diameter $D_1$. The diameter $D_1$ is chosen so as to be slightly undersized relative the outside diameter $D_2$ of a self-contained bearing 30 to be held therewithin. For example, for a bearing having an outside diameter of approximately 1.25 inches (approximately 31.8 millimeters), $D_1$ of bearing race bore 16 might preferably be approximately 1.248 inches (about 31.70 millimeters). In this regard, for good compression of bearing 30, bearing race bore 16 is preferably undersized between about 0.002 inches and about 0.005 inches (between about 0.05 millimeters and 0.13 millimeters).

Figure 4:
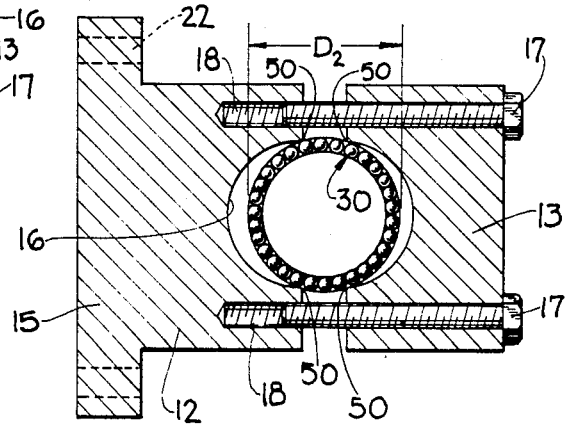
FIG. 4 is a cross-sectional view of the bearing block of FIG. 3, shown during the clamping operation about a self-contained bearing.

FIG. 4 illustrates the procedure in which bearing block 10 is clamped about a self-contained bearing 30. In particular, bearing 30 would be pressed onto a shaft or the like (not shown) and then placed between base piece 13 and clamp piece 12 of bearing block 10. At this point, the threaded fasteners 17 would be started to losely attach the pieces about bearing 30. Obviously because the outer diameter $D_2$ of bearing 30 is slightly larger than diameter $D_1$ of bearing race bore 16, bearing 30 will not quite fit within bore 16 without some compression. Prior to tightening the threaded fasteners 17, the lateral position of bearing 30 and its attached shaft within bearing block 10 should be properly aligned (if necessary) with the balance of the robotic manipulator. Following any such alignment procedures, threaded fasteners 17 are simply torqued into position thereby pulling clamp piece 13 inwardly relative to base piece 12 and compressing bearing 30 therewithin. Because bore 16 is slightly undersized relative the outer diameter $D_2$ of bearing 30, when clamp piece 13 is drawn snugly against base piece 12, bearing 30 will be compressed therewithin about substantially its entire periphery. In this regard, the term "substantially" is utilized to indicate that there may be some very minimal portions immediately adjacent the interface of clamp piece 13 and base piece 12 along axis 14 wherein completely uniform inward compression is not achieved. In particular, as bearing 30 is compressed between clamp piece 13 and base piece 12 (as shown in FIG. 4), there may be some very localized material fatiguing (i.e. at points 50) that may occur thereby reducing the resultant inward compression achieved at this particular point. However, the overall impact of these fatique spots on the otherwise uniform inward compression achieved by the subject bearing block is inconsequential as the limit of the vector of such force differential is zero. Consequently, the result is a bearing block which can effectively remove the inherent clearance manufactured into a self-contained bearing in a uniform manner which does not require traditional shimming, fitting, grinding and the like to prevent deformation of such bearing during installation. In this way, bearing installation and alignment is facilitated, and bearing service life wil be maximized by more reliably proper installation.

While dividing axis 14 is illustrated in the figures as being oriented in a substantially perpendicular relationship to the central longitudinal axis X (FIG. 1) of body portion 11, such orientation is shown only as a preferred embodiment of the subject invention and is not critical to realization of the benefits described herein. Practically speaking, however, the perpendicular relationship is preferred as it generally facilitates the attachment of clamp piece 13 to base piece 12 by a plurality of threaded fasteners which can be attached in a parallel fashion. It is contemplated, however, that non-perpendicular dividing axes might be advantageous for a particular bearing block 10 to be mounted on a robotic manipulator in a location which is relatively difficult to reach in other than an obtuse direction.

The method of manufacturing bearing block 10, as described above, includes the steps of forming the bearing block body, splitting the bearing block body along a dividing axis to provide a base piece and a removably attachable clamp piece, locating a center point of the body portion along such dividing axis, providing means to removably attach the clamp piece to the base piece, and boring a bearing race bore through the body portion at the center point while holding the base and clamp pieces in a face to face relation along the dividing axis.

An alternative method of boring the bearing race bore 16 would be to locate the center point of the body portion 19 prior to splitting the bearing block body 11. At this time, the bearing race bore could be preliminarily drilled out smaller than the desired diameter $D_1$. Following such preliminary boring, body portion 11 would be split along a dividing axis 14 which passes through center point 19 of the preliminary bearing race bore. Following this splitting step, the resulting clamp piece 13 is to be removably attached to base piece 12 as described above prior to the final boring operation. This modified method of producing bearing block 10 may facilitate more accurate location of bearing race bore 16 along dividing axis 14 depending upon particular manufacturing equipment used.

Figure 5:
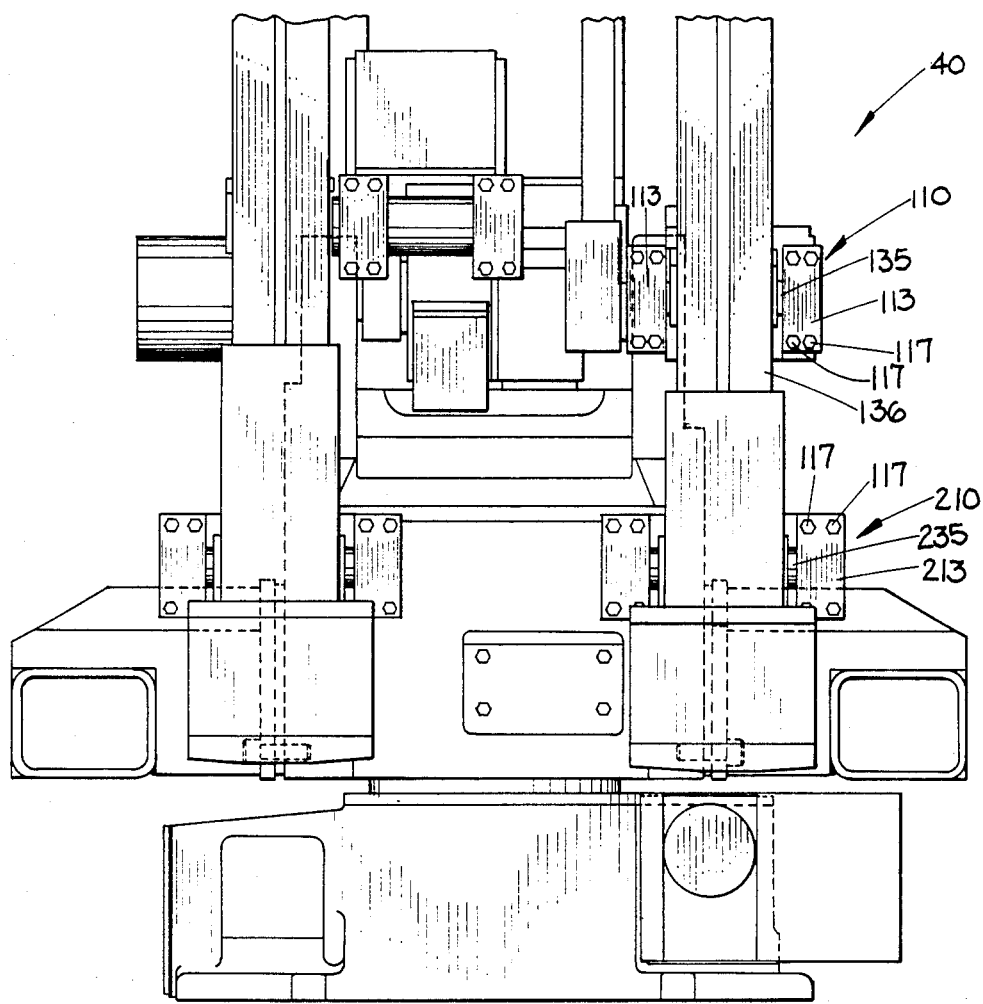
FIG. 5 is a front elevational view of a portion of a robotic manipulator illustrating the incorporation of bearing blocks made in accordance with the present invention to anchor several self-contained bearings of a moving part of such robotic manipulator.
Figure 6:
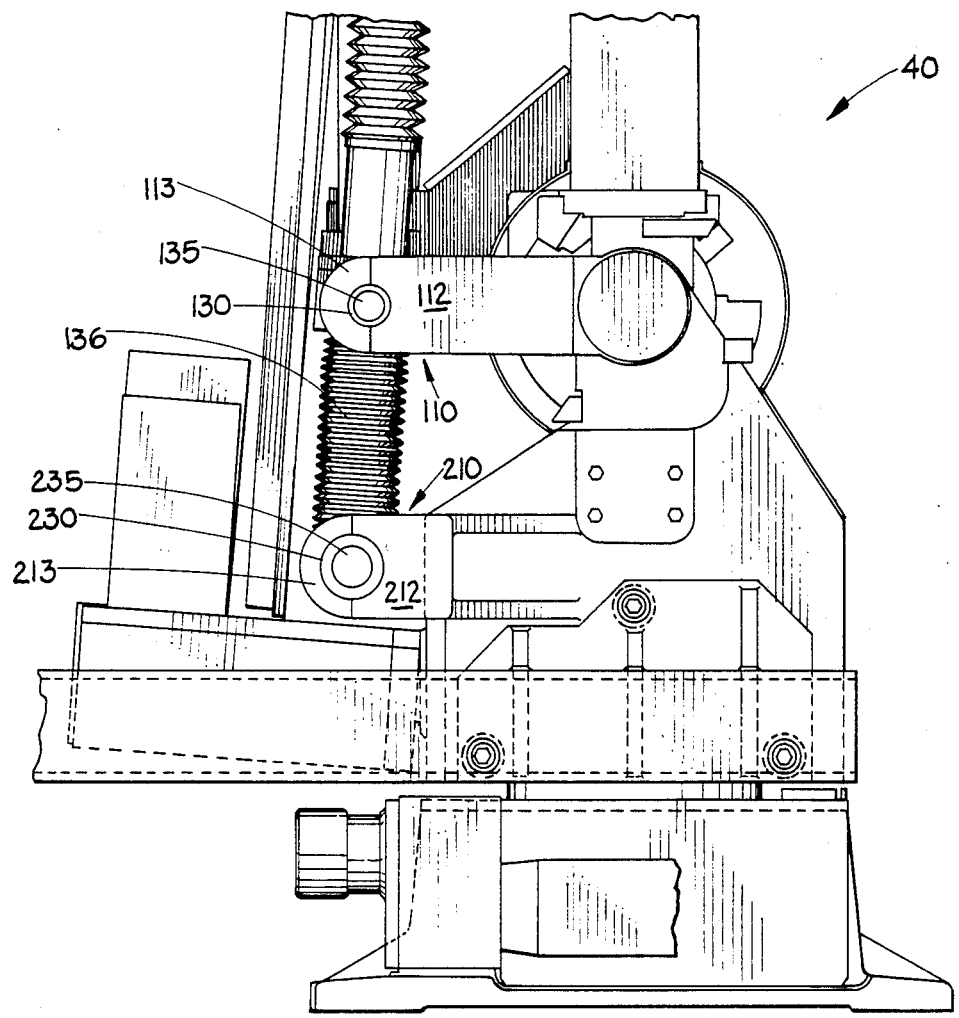
FIG. 6 is an elevational view of the robotic manipulator of FIG. 5 taken from the right side thereof.

As was discussed above, often in applications for robotic manipulators it will be necessary for a pair of bearing block body portions 11 to be mounted on a robotic manipulator in spaced relationship to one another in order to anchor a corresponding pair of bearings forming a rotational axis for a moving part of such robotic manipulator. Examples of such paired application of the subject invention is shown in FIGS. 5 and 6 wherein two bearing blocks 110 and 210, respectively, are utilized to anchor bearings which provide rotational axes for a common ball screw arrangement 136 for a moving part of a robotic manipulator 40. In particular, the bearing block 110 is illustrated as anchoring a pair of spaced bearings 130 on shaft 135. Similarly, bearing block 210 supports the corresponding pair of bearings 230 for the rotational axis formed by shaft 235. Threaded fasteners 117 are depicted in FIG. 5 as being countersunk within clamp pieces 113 and 213, respectively, in this particular application. FIGS. 5 and 6 also illustrate an example of an application in which it would be necessary to vertically align ball screw arrangement 136 by proper alignment of bearings 130 and 230 within bearing blocks 110 and 210 during installation.

The overall dimensions of any particular bearing block made is accordance with this invention will vary depending upon the particular application, strength requirements, and the like. For example, it has generally been found that for standard robotic applications for payloads of approximately 50 pounds (about 22.5 kilograms) being manipulated over distances of approximately 5 feet (or about 1.5 meters), bearing blocks made of steel and having a thickness of between about 1.25 and 2.5 inches (between about 31.8 millimeters and about 63.5 millimeters) are satisfactory. Also, as illustrated in FIG. 6, the outer edges of the clamp piece of a particular bearing block (e.g. clamp pieces 113 and 213) can be rounded and the threaded fasteners can be countersunk therewithin as desired. If has also been found that where a pair of bearing block body portions are to be utilized in conjunction with spaced bearings of a single rotating shaft, as described above, it may facilitate the alignment procedures of the respective bearing blocks if such body portions are fixed relative to one another (e.g. welded to a mounting means such as mounting plate 15 shown in FIG. 2) prior to boring of the respective bearing race bores 16. If, however, the spacing between the respective body portions is relatively large, simultaneous drilling of such spaced bores may not be practical on standard boring equipment. In such case, the body portions would necessarily have their bearing race bores formed independently and, thereafter, properly aligned for mounting on the robotic manipulator.

Having shown and described the preferred embodiment in the present invention, further adaptions of the bearing block can be accomplished by appropriate modifications by one of ordinary skill in the art without departing from the scope of the present invention. Accordingly, the scope of the present invention should be considered in terms of the following claims and is understood not be limited to the details of the methods and structures shown and described in the specification and drawings.

We claim:

1. A process for manufacturing a bearing block for anchoring a self-contained bearing for a moving part of a robotic manipulator to said robotic manipulator, said process comprising the following steps:
    (a) forming a bearing block body;
    (b) splitting said bearing block body along a dividing axis to provide a base piece to be attached to said robotic manipulator and a clamp piece to be removably attached to said base piece;
    (c) locating a center point of said body along said dividing axis;
    (d) providing means to removably attach said clamp piece to said base piece; and
    (e) boring a bearing race bore through said body at said center point "while" said base and clamp pieces are held in face to face relation along said dividing axis, said bore having an inside diameter slightly less than the outside diameter of a self-contained bearing to be held therewithin, such that when said clamp piece is attached to said base piece about such a self-contained bearing, a relatively uniform inward compressive force is provided about substantially the entire inner periphery of said bearing race bore against the outer periphery of such bearing.

2. The process of claim 1, wherein the step of providing means to removably attach said clamp piece to said base piece is accomplished by at least one threaded fastener.

3. The process of claim 2, wherein said bearing block further comprises a pair of spaced bearing block bodies to anchor a pair of spaced self-contained bearings for a moving part of a robotic manipulator, said process further comprising the additional steps of fixing said bearing block bodies relative one another and aligning the respective bearing race bores thereof.

4. A process for manufacturing a bearing block for anchoring a self-contained bearing for a moving part of a robotic manipulator to said manipulator, said process comprising the following steps:
    (a) forming a bearing block body;
    (b) locating a center point within said block body where a bearing race bore shall be bored;
    (c) boring a preliminary bore in said block body at said center point, said preliminary bore locating the placement of said bearing race bore to be formed through said block body;
    (d) splitting said bearing block body along a dividing axis which passes through said center point, thereby dividing said block body into a base piece to be attached to said robotic manipulator and a clamp piece to be removably attached to said base piece;
    (e) providing means to removably attach said clamp piece to said base piece; and
    (f) boring said bearing race bore through said block body at said preliminary bore and center point while holding said base and clamp pieces in face to face relation along said dividing axis, said bearing race bore having an inside diameter slightly less than the outside diameter of a self-contained bearing to be held therewithin such that when said clamp piece is attached to said base piece about such a self-contained bearing, a relatively uniform inward compressive force is provided about substantially the entire inner periphery of said bearing race bore against the outer periphery of such bearing.

* * * * *